United States Patent Office 3,013,968
Patented Dec. 19, 1961

3,013,968
PREPARATION OF SUSPENSION OF WATER-SOLUBLE SOLIDS IN OLEAGINOUS MEDIA
Edward John Blake, Sunbury-on-Thames, England, assignor to The British Petroleum Company Limited, London, England, a British joint-stock corporation
No Drawing. Filed July 20, 1959, Ser. No. 828,078
Claims priority, application Great Britain July 23, 1958
15 Claims. (Cl. 252—18)

This invention relates to the preparation of suspensions of water-soluble solids in oleaginous media, such as hydrocarbons, in which the solids are insoluble.

It is often desired to incorporate water-soluble, oil-insoluble solids in oleaginous media, such as mineral lubricating oils and greases. For example, sodium nitrite at about 2% weight concentration is now frequently used as a corrosion inhibitor in lubricating grease. To be effective as a corrosion inhibitor and to eliminate any abrasive tendencies, the crystals of the sodium nitrite must be stably dispersed and of very small particle size, preferably less than 5 microns. The same considerations also often apply to dispersions of other water-soluble solids in other oleaginous media.

One method of obtaining a stable suspension of finely divided particles is to use large amounts of petroleum sulphonates as dispersing agents but it has been stated that the compositions produced are very sensitive to the presence of water and, in the case of greases, tend to lose their structure.

Another method which has recently been proposed for this purpose is to emulsify an aqueous solution of the solid with an oleaginous liquid to form a water-in-oil emulsion using an emulsifying agent capable of forming such an emulsion, and thereafter heating the emulsion to drive off the water. However, when using the emulsifying agents suggested for this technique, e.g. sodium stearate, sodium hydroxystearate, basic calcium alkyl sulphonates and sodium alkyl sulphonate, poor dispersions with large individual crystal sizes were obtained.

I have now found that improved suspensions can be obtained by using particular materials as emulsifying and dispersing agents.

According to the invention, there is provided a method of preparing a suspension of particles of a water-soluble solid in an oleaginous medium, in which an aqueous solution of the solid is emulsified with an oleaginous liquid to form a water-in-oil emulsion using as an emulsifying agent a petroleum wax oxidate, and thereafter dehydrating the emulsion.

Petroleum wax oxidates are well known and readily available materials which can easily be prepared by several established methods, e.g. by air blowing petroleum wax at elevated temperature in the presence of potassium permanganate as catalyst. Preferred petroleum wax oxidates are those having saponification values in the range 5–100 mg. KOH/g. The wax oxidates may be obtained by oxidising paraffin wax, i.e. the wax obtained by dewaxing a vacuum distillate, or residual (microcrystalline) wax, i.e. the wax obtained by dewaxing a de-asphalted vacuum residue. An improved method of producing residual wax oxidates using a paraffin wax oxidate as catalyst for the oxidation reaction is described in the specification of co-pending U.K. patent application (23673/58). Another improved method of producing residual wax oxidates using a catalyst containing a lead soap for the oxidation reaction is described in the specification of co-pending U.K. patent application (23674/58).

In carrying out the method of the invention, the wax oxidate may conveniently be dissolved in the oleaginous liquid and the aqueous solution thereafter added. The emulsion may be produced by agitation of the mixture, e.g. by rapid stirring, or by milling, or by stirring and milling. Dehydration of the emulsion may be most conveniently effected by heating, e.g. at a temperature of 115°–170° C. During dehydration by heating it is advisable to continue stirring the emulsion to reduce foaming and prevent the emulsion breaking.

The oleaginous liquid may be a mineral oil, e.g. a lubricating oil, a residue or a kerosine. It may also be a vegetable oil, e.g. castor oil, or a synthetic oil, e.g. a diester, a polyglycol, a polyether or a silicon-containing synthetic oil. In order to produce a lubricating grease containing a suspension of water-soluble solid, a suspension of the solid in lubricating oil prepared as described above may be mixed with a grease.

Preferably the amount of wax oxidate used is 0.1–10% especially 0.5–7.5% by weight on the oleaginous liquid. In general it is desirable to use a fairly concentrated solution of the water-soluble solid as this reduces the amount of water which has to be removed from the emulsion.

A number of examples of the invention will now be described. In the examples, the wax oxidate emulsifying/dispersing agents used are designated A, B, C, D, E, F, G, H, I, J, K, L, M and N. The preparation and properties of oxidates A–M are outlined in the following table. Oxidate N was a commercially available oxidised microcrystalline wax having the following properties:

Saponification value_____ 51 mg. KOH/g.
Acid value_____ 12 mg. KOH/g.
Melting point_____ 97.5° C.
Congealing point_____ 188.5° C.

TABLE

| Wax Oxidate | Prepared from— | Catalyst used | Wax oxidate product | | |
|---|---|---|---|---|---|
| | | | Acid value, mg. KOH/g. | Sap. value, mg. KOH/g. | M.W. |
| A | Paraffin Wax, Setting point 148° F., M.W. 492. | 0.66% Manganese dioxide | 10 | 30 | 478 |
| B | Microcrystalline wax, melting point 80.2° C., M.W. 728. | 1% Manganese linoleate, 0.1% Magnesium hydroxide. | 2 | 16 | |
| C | As B | 1% Lithium stearate, 0.1% Magnesium hydroxide. | 5 | 35 | |
| D | As B | ___do___ | | 51 | |
| E | As B | 10% Lithium stearate, 1% Magnesium hydroxide. | 4.6 | 65 | |
| F | As B | 10% Paraffin wax oxidate of acid value 112. | 4 | 22 | |
| G | As B | 10% Paraffin wax oxidate of acid value 42. | 1.5 | 7 | |

TABLE—Continued

| Wax Oxidate | Prepared from— | Catalyst used | Wax oxidate product | | |
|---|---|---|---|---|---|
| | | | Acid value, mg. KOH/g. | Sap. value, mg. KOH/g. | M.W. |
| H | Slack microcrystalline wax containing 41% wt. oil. | 10% Paraffin wax oxidate of acid value 31. | 2 | 14 | |
| I | Slack microcrystalline wax containing 38% wt. oil. | 10% Paraffin wax oxidate of acid value 156. | 5 | 13 | |
| J | Slack microcrystalline wax containing 27% wt. oil. | 10% lead stearate | 5 | 11 | |
| K | Slack microcrystalline wax containing 18% wt. oil. | 5% Lead stearate, 5% Potassium permanganate. | 13 | 78 | |
| L | Slack microcrystalline wax containing 14% wt. oil. | 1% Lead stearate, 1% Potassium permanganate. | 6 | 40 | |
| M | Slack microcrystalline wax containing 16% wt. oil. | 10% Paraffin wax oxidate of acid value 156. | 4 | 10 | |

Percentages of catalyst quoted are percent wt. on wax feedstock.
M.W.=Molecular weight. Sap. val.=Saponification value.

*Example 1*

Five grams of petroleum wax oxidate were dissolved in 100 grams of 150/75 grade mineral lubricating oil (Redwood I viscosity at 140° F.: 150 seconds; viscosity index :75) by warming and gentle stirring. Fifteen grams of sodium nitrite crystals were dissolved in 30 grams of distilled water.

The oil/wax oxidate solution was then gently stirred while the sodium nitrite solution was poured into the oil. The speed of stirring using a laboratory type high speed dispersator was then increased to the maximum and a thick water-in-oil emulsion was produced. This emulsion was then heated to 140–150° C. to drive off the water while high speed stirring was continued and the mix was then allowed to cool to atmospheric temperature with gentle stirring.

The experiment was carried out using in turn wax oxidates A, B, C, D, F, G, H, I, J, K, L, and M and N. On examining the products under the microscope using polarised light, it was found that a fine even dispersion of sodium nitrite crystals had been obtained in each case, the individual particle sizes being about 1 micron.

The above experiments were repeated using wax oxidate N as the emulsifying/dispersing agent and using, instead of 150/75 grade mineral lubricating oil, the following non-mineral oils:

(a) A methylphenylpolysiloxane available commercially as MS 550.
(b) Castor oil.
(c) A polyoxyalkylene glycol ether available commercially as UCON fluid LB 1715.
(d) Octyl nonyl sebacate.

Inspection data on these four oils are given in the following table:

| | MS 550 fluid | Castor Oil | UCON fluid LB 1715 | Octyl Nonyl Sebacate |
|---|---|---|---|---|
| Specific Gravity 60° F./60° F. | 1.070 | | 1.003 | |
| Kinematic viscosity at 0° F., cs | | | 31,000 | |
| Kinematic viscosity at 100° F., cs | 230 | 289.8 | 371 | 15.55 |
| Kinematic viscosity at 140° F., cs | 90 | 84.05 | | |
| Kinematic viscosity at 210° F., cs | 25 | 19.82 | 55.3 | 3.93 |
| Viscosity Index | 125 | 85 | 134 | 175 |

In all cases, a fine even dispersion of the sodium nitrite crystals was obtained, the individual particle sizes being about 1 micron.

*Example 2*

Twenty-five grams of wax oxidate D were dissolved in 500 grams of 150/75 grade lubricating oil. Seventy-five grams of sodium nitrite were dissolved in 150 grams of water. The aqueous solution and oil phase were mixed and emulsified by high speed stirring at a temperature of about 60° C. followed by a milling step. The water was then driven off by heating to 140° C. to give a very fine dispersion.

*Example 3*

Example 2 was repeated using four times the quantities quoted. Again a very fine dispersion was obtained.

*Example 4*

Example 2 was repeated using thirteen grams of wax oxidate D instead of twenty-five, the quantities of the other materials remaining unchanged. Again a very fine dispersion was obtained.

*Example 5*

100 grams of wax oxidate D were dissolved in 2000 grams of 150/75 grade lubricating oil. 300 grams of sodium nitrite were dissolved in 600 grams of distilled water and the oil and aqueous solution mixed using a laboratory type high speed dispersator for 5 minutes at a temperature of about 60° C., to form an emulsion which was then milled. The emulsion was heated to 140° C. with stirring and a good dispersion was obtained.

A batch of lithium base grease was then made in known manner from:

4.075 lb. Hardened (hydrogenated) castor oil,
0.57 lb. Lithium hydroxide monohydrate, and
21.0 lb. Mineral lubricating oil (150/75 grade).
(Hardened castor oil is essentially glyceryl tri-12-hydroxystearate).

When the grease had cooled to 80° C. the sodium nitrite dispersion (which by now had cooled to room temperature) was run into the grease slowly with constant stirring. The product was then milled and deaerated to give a grease in which the $NaNO_2$ concentration was 2.2% wt. and the wax oxidate concentration, 0.7% wt. Inspection data on the product were as follows:

| | |
|---|---|
| Penetration—unworked (IP 50/56) | 238 mm./10. |
| Penetration—worked: 60 strokes (IP 50/56) | 246 mm./10. |
| Penetration — worked: 100,000 strokes (IP 50/56) | 274 mm./10. |
| Drop point (IP 31) | 180° C. |
| Free acidity (IP 37/55) | Nil. |
| Free alkalinity (IP 37/55) | 0.90%. |
| Oil separation on storage at 25° C. (IP 121/57) | 0.1% wt. |
| Bleed test (DTD 825A) | 1.7% wt. |
| Penetration after 4 hours in Shell Roll tester at room temperature (SMS 466) | 249 mm./10. |

Penetration after 4 hours in Shell
  Roll tester at 100° C. (SMS
  466) _____ 300 mm./10.
NaNO₂ particle size_____ Less than 5.
Skefko corrosion test_____ No rusting observed.

Example 6

A lithium base grease was made in the same manner as in Example 5 using:

|   | Grams |
|---|---|
| Hardened castor oil | 405 |
| Lithium hydroxide monohydrate | 57 |
| Mineral lubricating oil (150/75 grade) | 2038 |
| 'Topanol' O (Registered Trade Name) | 15 |

(Topanol O is a commercially available oxidation inhibitor: it was added at 100° C. as the grease was cooling).

When the grease had cooled to 80° C., the sodium nitrite dispersion of Example 4 was added slowly with stirring and the grease was then milled and deaerated to give a grease in which the NaNO₂ concentration was 2.5% wt. and the wax oxidate concentration, 0.4% wt. Inspection data on the product were as follows:

Penetration—unworked (IP 50/
  56) _____ 216 mm./10.
Penetration—worked: 60 strokes
  (IP 50/56) _____ 212 mm./10.
Penetration — worked: 100,000
  strokes (IP 50/56) _____ 284 mm./10.
Penetration after 4 hours in Shell
  Roll tester at room temperature
  (SMS 466) _____ 222 mm./10.
Penetration after 4 hours in Shell
  Roll tester at 100° C. (SMS
  466) _____ 290 mm./10.
Drop point (IP 31) _____ 180° C.
Free acidity (IP 37/55) _____ Nil.
Free alkalinity (IP 37/55) _____ 0.76%.
Oil separation on storage at 25° C.
  (IP 121/57) _____ Nil.
Bleed test (DTD 825A) _____ Nil.
NaNO₂ particle size_____ Less than 5.
Skefko corrosion test_____ No rusting observed.

Example 7

100 grams of wax oxidate E were dissolved in 2000 grams of 150/75 grade lubricating oil. 340 grams of sodium nitrite were dissolved in 450 grams of water. The oil and aqueous solutions were emulsified and the emulsion dehydrated as in Example 5.

A lithium base grease was made in the same manner as in Example 5 using:

|   | lb. |
|---|---|
| Hardened castor oil | 3.0 |
| Lithium hydroxide monohydrate | 0.42 |
| Mineral lubricating oil (150/75 grade) | 21.0 |
| Topanol O | 0.15 |

The grease was cooled to 40° C. and the sodium nitrite dispersion added slowly with stirring. The grease was milled and a further 3 lb. of the same lubricating oil stirred in to adjust consistency. The grease had a NaNO₂ concentration of 2.28% wt. and a wax oxidate concentration of 0.67% wt. Inspection data were as follows:

Penetration—unworked (IP 50/56) _____ 278 mm./10.
Penetration—worked: 60 strokes (IP 50/
  56) _____ 281 mm./10.
Drop point (IP 31) _____ 178° C.
NaNO₂ particle size _____ Less than 5.

The greases of Examples 5, 6 and 7 containing sodium nitrite dispersions were all able to be pumped easily through screens of 200 BSS size. The grease of Example 5 was stored for two months and no crystal growth or agglomeration of particles was observed.

Example 8

1.0 lb. of wax oxidate N was dissolved in 15.8 lb. of 150/75 grade mineral lubricating oil by warming and stirring. 3.8 lb. of sodium nitrite were dissolved in 7 lb. of water and the sodium nitrite solution was roughly emulsified with the wax/oil solution by stirring in a grease kettle. This partial emulsion was passed twice through a colloid mill at 0.001 inch gap setting to produce a fine emulsion.

This emulsion was placed in a grease kettle and heated rapidly with stirring to 140° C. to drive off the water and leave a fine dispersion of sodium nitrite in lubricating oil.

A lithium base grease was then prepared in known manner from:

|   | Lb. |
|---|---|
| Hardened castor oil | 15.9 |
| Lithium hydroxide monohydrate | 2.2 |
| Mineral lubricating oil (150/75 grade) | 119.0 |
| Phenyl-α-naphthylamine | 0.85 |

When both the grease and the dispersion had cooled to room temperature they were thoroughly mixed together to give a grease having a final formulation as follows:

|   | Lb. | Percent wt. |
|---|---|---|
| Dispersion: | | |
| Sodium nitrite | 3.80 | 2.40 |
| Wax oxidate N | 1.00 | 0.63 |
| Mineral oil (150/75 grade) | 15.8 | 9.96 |
| Basic grease: | | |
| Hardened castor oil | 15.9 | 10.03 |
| Lithium hydroxide monohydrate | 2.2 | 1.39 |
| Mineral oil (150/75 grade) | 119.0 | 75.05 |
| Phenyl-α-naphthylamine | 0.85 | 0.54 |
|   | 158.55 | 100.00 |

Inspection and performance testing data on this grease were as follows:

Penetration—unworked (IP 50/56) __ 255 mm./10.
Penetration—worked: 60 strokes (IP
  50/56) _____ 271 mm./10.
Penetration—worked: 100,000 strokes
  (IP 50/56) _____ 322 mm./10.
Shell roll test (SMS 466):
  Penetration after 4 hrs. at room
    temperature (160 r.p.m.) _____ 296 mm./10.
  Penetration after 4 hrs. at 100°
    C. (160 r.p.m.) _____ 336 mm./10.
Free acid (as oleic acid) (IP 37/55) _ Nil.
Free alkali (as LiOH) (IP 37/55) __ 0.81% wt.
Oil separation on storage at 25° C.
  (IP 121/57) _____ 1.1% wt.
Bleed test (DTD 825A) _____ 4.4% wt.
Sodium nitrite particle size_____ <5μ.
Skefko corrosion test_____ Pass (no rusting).
Skefko procedure 2 test_____ A good pass.
Skefko procedure 3 test_____ A good pass.

Example 9

A grease was made in identical manner to Example 8 except that the quantity and proportions of ingredients were different as shown below:

|   | Lb. | Percent wt. |
|---|---|---|
| Dispersion: | | |
| Sodium nitrite | 0.750 | 2.40 |
| Wax oxidate N | 0.220 | 0.71 |
| Mineral oil (150/75 grade) | 4.410 | 14.14 |
| Basic grease: | | |
| Hardened castor oil | 4.075 | 13.06 |
| Lithium hydroxide monohydrate | 0.570 | 1.83 |
| Mineral oil (150/75 grade) | 21.000 | 67.32 |
| Phenyl-α-naphthylamine | 0.170 | 0.54 |
|   | 31.195 | 100.00 |

Inspection and performance testing data on these greases were as follows:

| | |
|---|---|
| Penetration—unworked (IP 50/56) | 234 mm./10. |
| Penetration—worked: 60 strokes (IP 50/56) | 232 mm./10. |
| Penetration—worked: 100,000 strokes (IP 50/56) | 269 mm./10. |
| Shell roll test (SMS 466): | |
|   Penetration after 4 hrs. at room temperature (160 r.p.m.) | 239 mm./10. |
|   Penetration after 4 hours at 100° C. (160 r.p.m.) | 264 mm./10. |
| Free acid (as oleic acid) (IP 37/55) | Nil. |
| Free alkali (as LiOH) (IP 37/55) | 0.95% wt. |
| Oil separation on storage at 25° C. (IP 121/57) | 0.1% wt. |
| Bleed test (DTD 825A) | 1.4% wt. |
| Sodium nitrite particle size | <5μ. |
| Skefko corrosion test | Pass (no rusting). |
| Skefko procedure 2 test | A good pass. |
| Ransome and Marles Horizontal test | A good pass. |
| Ransome and Marles Vertical test | A good pass. |

It will be seen that not only do the products of Examples 8 and 9 have the desired antirust properties, but also that their lubrication properties are excellent.

*Example 10*

By way of comparison, a lithium base grease was made in the same manner as in Example 5 using the following ingredients:

| | Percent wt. |
|---|---|
| Mineral lubricating oil (150/75 grade) | 85.2 |
| Hardened castor oil | 13.0 |
| Lithium hydroxide monohydrate | 1.8 |

No sodium nitrite was added.

Inspection data were as follows:

| | |
|---|---|
| Penetration Unworked (IP 50/56) | 251 mm./10. |
| Penetration—worked: 60 strokes (IP 50/56) | 238 mm./10. |
| Penetration — worked: 100,000 strokes (IP 50/56) | 289 mm./10. |
| Penetration after 4 hrs. in Shell Roll tester at room temperature (SMS 466) | 251 mm./10. |
| Penetration after 4 hrs. in Shell Roll tester at 100° C. (SMS 466) | 336 mm./10. |
| Drop point (IP 31) | 189° C. |
| Free acidity (IP 37/55) | Nil. |
| Free alkalinity (IP 37/55) | 0.09%. |
| Oil separation on storage at 25° C. (IP 121/57) | 2.4% wt. |
| Bleed test (DTD 825A) | 3.9% wt. |
| Skefko corrosion test | Severe rusting on all bearing parts. |

It appears from the above data that the presence of sodium nitrite in a lithium grease may cause a slight lowering of drop point but this is not significant in terms of rig performance and the drop points of the greases of Examples 5, 6 and 7 are as good as the drop points of currently marketed lithium greases containing sodium nitrite.

The mill used in the above examples was a Premier Colloid Paste Mill. This is a high speed mill (3000 revolutions per minute) in which the material to be milled is fed between a 5 inch carborundum rotor and a carborundum stator, the annular gap being variable up to 0.025 inch. A mill gap of 0.001 inch was used for producing oil/sodium nitrite solution emulsions.

The Skefko corrosion test was carried out in a rig consisting essentially of a 35 millimetre bore, double row, self aligning ball race fitted with a pressed steel cage and housed in a plummer block. It was operated at 80 revolutions per minute and with no load applied. The bearing is filled with the grease under test and the housing is packed in such a way as to form a cup round the bearing, 20 millilitres of water are introduced into this cup. The rig is run (with water present) on 3 consecutive days for 8 hours each day followed by a 3–4 day static period. At the end of this static period the bearing parts are examined for rusting and corrosion.

The Skefko procedure 2 test was carried out as follows. The grease is tested in a 2.4 inch diameter spherical roller bearing, which operates at 2,500 r.p.m. and is subjected to a radial load of 851 kilograms. The test lasts for 667 hours and no heat is applied to the bearing. To pass the test a grease must show no undue deterioration in texture and the bearing must be unworn and in good condition on completion of the test.

The Skefko procedure 3 test was carried out in the same manner as procedure 2 test except that the test is of 480 hours duration and the temperature is raised in stages to a maximum of 115° C.

In the Ransome and Marles Horizontal test the grease is tested in a 4 inch diameter roller bearing operating at 2000 r.p.m. The test bearing is mounted on a horizontal shaft and is subjected to a radial load of 1000 pounds. The test duration is 1000 hours and no heating is applied during the test. To pass the test a grease must complete the test without undue deterioration in texture and the bearing must be substantially unworn. No undue temperature rise (i.e. not greater than 80° C. may occur during the test).

In the Ransome and Marles Vertical rig test the grease is tested in a 3 inch ball bearing mounted on a vertical shaft. The bearing is operated at 1500 r.p.m. with an applied axial load of 600 lb. No heat is applied during the test. Test duration is 1,000 hours. The requirements for a pass are substantially the same as for the Ransome and Marles Horizontal rig test.

I claim:
1. A method of preparing a suspension of particles of a water-soluble solid in an oleaginous medium, in which an aqueous solution of the solid is emulsified with an oleaginous liquid to form a water-in-oil emulsion using as an emulsifying agent a petroleum wax oxidate, and the emulsion is thereafter dehydrated.

2. A method according to claim 1, in which the wax oxidate is dissolved in the oleaginous liquid and the aqueous solution thereafter added.

3. A method according to claim 1, in which the emulsion is produced by agitating the oleaginous and aqueous phases.

4. A method according to claim 1, in which the dehydration of the emulsion is effected by heating.

5. A method according to claim 1, in which the petroleum wax oxidate has a saponification value in the range 5–100 mg. KOH/g.

6. A method according to claim 1, in which the wax oxidate has been obtained by oxidising a residual microcrystalline wax.

7. A method according to claim 1, in which the oleaginous liquid is a lubricating oil.

8. A method according to claim 1, in which the amount of wax oxidate used is 0.5–10% by weight of the oleaginous liquid.

9. A method according to claim 1, in which the water-soluble solid is sodium nitrite.

10. A method according to claim 4, in which the heating is carried out at a temperature of 115°–170° C.

11. A method according to claim 7, in which the lubricating oil is a mineral lubricating oil.

12. A method according to claim 8, in which the amount of wax oxidate used is 0.5–7.5% by weight of the oleaginous liquid.

13. A method of producing a lubricating grease containing a suspension of particles of a water-soluble solid, in which a suspension of particles of the water-soluble solid in an oleaginous liquid is prepared in a manner as specified in claim 1, and the resulting suspension is mixed with a grease.

14. A method according to claim 13, in which the concentration of the water-soluble solid suspended in the grease is 0.5–5% by weight.

15. A method according to claim 13, in which the water-soluble solid is sodium nitrite.

References Cited in the file of this patent

UNITED STATES PATENTS

| | | |
|---|---|---|
| 2,043,922 | Burwell et al. | June 9, 1936 |
| 2,455,659 | Duncan et al. | Dec. 7, 1948 |
| 2,652,361 | Woods et al. | Sept. 15, 1953 |
| 2,705,241 | McKinley et al. | Mar. 29, 1955 |
| 2,758,981 | Cooke et al. | Aug. 14, 1956 |
| 2,831,809 | Peterson | Apr. 22, 1958 |